Oct. 27, 1931.    W. A. MORTON ET AL    1,828,904
HEAT TREATMENT CHAMBER
Filed Feb. 25, 1928    2 Sheets-Sheet 1
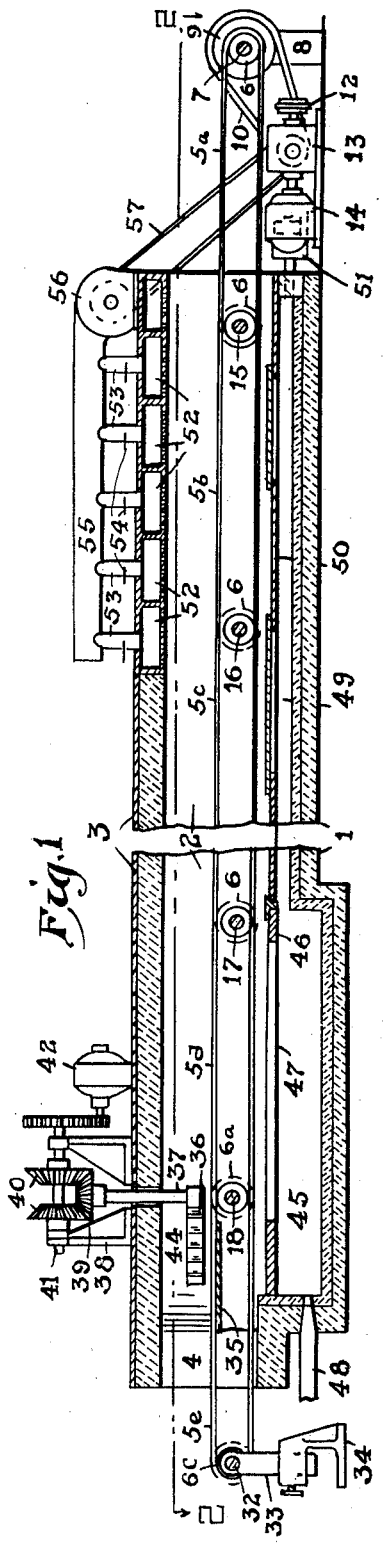
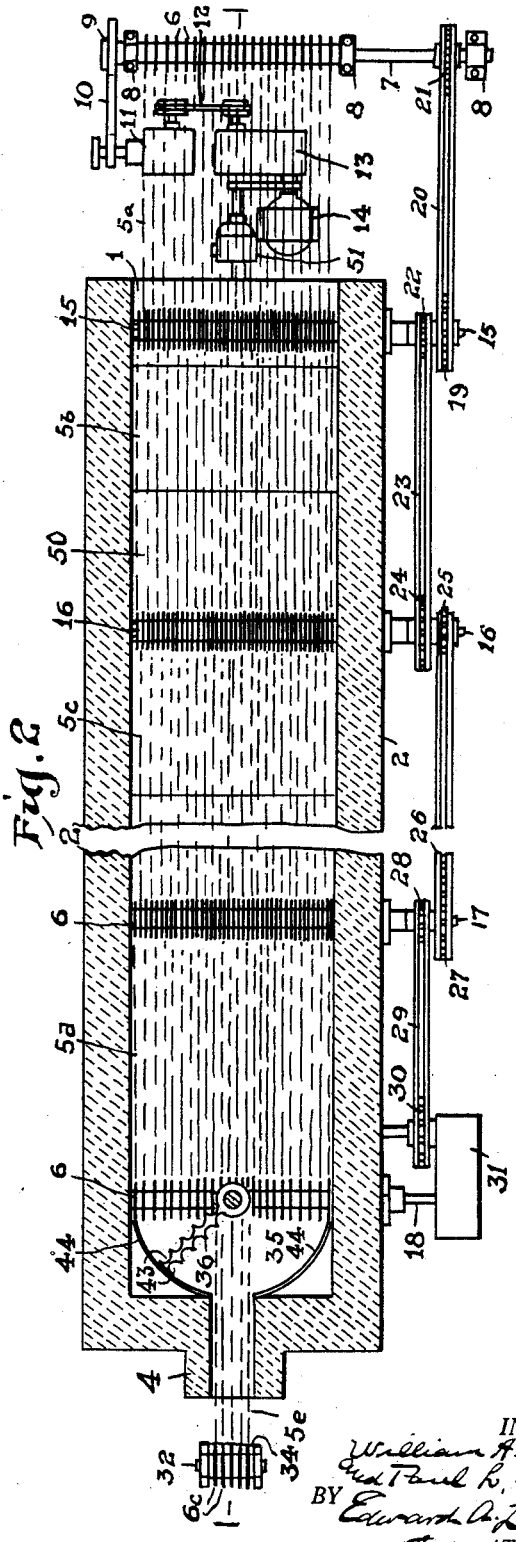
INVENTORS
William A. Morton
and Paul L. Geer
BY Edward A. Lawrence
their ATTORNEY

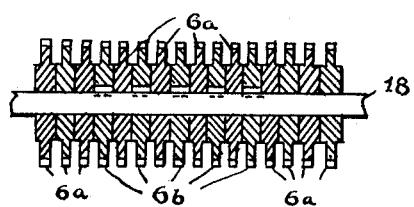
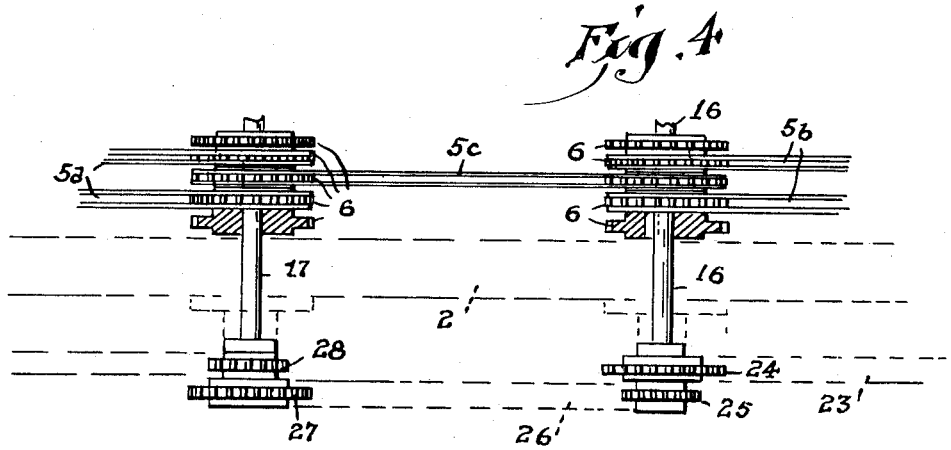
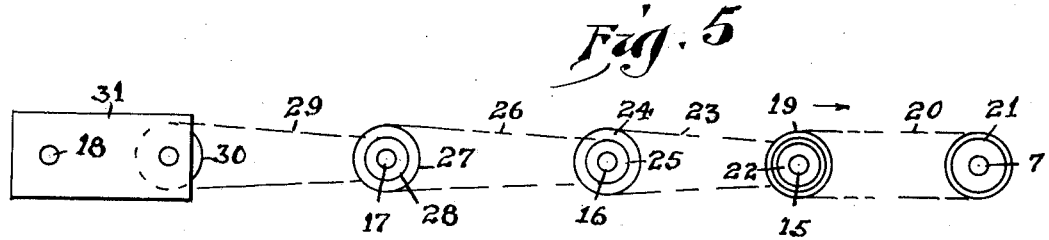

Patented Oct. 27, 1931

1,828,904

UNITED STATES PATENT OFFICE

WILLIAM A. MORTON, OF PITTSBURGH, AND PAUL L. GEER, OF BELLEVUE, PENNSYLVANIA, ASSIGNORS TO AMCO, INCORPORATED, OF PITTSBURGH, PENNSYLVANIA, A CORPORATION OF PENNSYLVANIA

HEAT-TREATMENT CHAMBER

Application filed February 25, 1928. Serial No. 256,856.

In many of the types of heat-treatment chambers now in use, as for instance lehrs for annealing glassware, the articles to be treated are caused to travel through the chamber on an endless conveyer extending through the chamber, and there is consequently a very marked temperature loss which must be replaced as the idle strand of the conveyer returns to the intake end of the chamber and before it may receive newly introduced articles. This involves a substantial fuel expenditure, and also complicates temperature regulation in the chamber.

One of the objects which we have in view is the elimination of this cause of temperature loss, and this object we accomplish by substituting for the single conveyer extending continuously through the heat-treatment chamber a plurality of conveyer elements, or sets of elements, in alined relation and so arranged that the ware is automatically caused to travel from one conveyer element or sets of elements to the next. By providing relatively short conveyers we localize the zones of heat transference and thus minimize heat losses and maintain a better control of temperature conditions within the lehr.

Another object which we have in view is the provision of means whereby the articles to be treated may be introduced into the heat-treatment chamber in single file or as received and then distributed for substantially the full internal width of the chamber. We are thus enabled to utilize the full capacity of the chamber.

For this purpose we provide an intake conveyer of less cross-sectional area but traveling at greater speed than the conveyer to which it delivers the articles, together with means for transferring the articles from the intake conveyer to the receiving conveyer and distributing the articles over the entire effective width of the chamber.

We are also enabled to provide a relatively narrow intake opening in the front of the chamber, thus eliminating a very substantial heat loss.

Another object which we have in view is the maintenance of heat uniformity in the articles during the heat-treatment operation, and we accomplish this by delivering the article by means of a relatively high speed intake conveyer to a more slowly moving chamber conveyer, thus causing the articles to be arranged in juxtaposition.

Another object which we have in view is to expedite the cooling of the articles as they approach the discharge end of the chamber, and this we accomplish by progressively increasing the speed of travel of the conveyer or conveyers, thus causing the wider separation of the articles.

We further expedite and control the cooling of the articles by the selective introduction of air into the chamber, preferably through the roof.

Other novel features of design and construction, and also of the arrangement of parts, will appear from the following description.

In the accompanying drawings wherein we have illustrated a practical embodiment of the principles of our invention in connection with a lehr for annealing glassware, Fig. 1 is a vertical section of the lehr taken along the line 1—1 in Fig. 2; Fig. 2 a horizontal section taken along the line 2—2 in Fig. 1; Fig. 3 an enlarged broken view partially in elevation and partially in section of the front conveyer shaft within the lehr and certain of the sprockets thereon; Fig. 4 an enlarged detail showing two of the conveyer shafts and their associated parts, and Fig. 5 a diagrammatic view illustrating the drive.

Referring to the drawings, the lehr tunnel or chamber is built of suitable material which is non-conductive of heat, and comprises the base 1, the side walls 2 and the roof 3. The rear or discharge end of the tunnel is preferably open for its full width to permit the extension of the conveyer therethrough, but the front or intake end of the tunnel is closed except for a relatively narrow central opening 4 through which the intake conveyer extends.

Instead of the usual single endless conveyer extending through the full length of the lehr tunnel, in our improved lehr we employ a plurality of sets of endless conveyers which may be belts or chains and whose ends are so associated that the articles travel from one to the next. The number of such sets may be determined by the length of the lehr tunnel or chamber and each conveyer or set of conveyers is short enough to substantially localize the zones of heat transference so as to minimize such loss.

As a suitable form of conveyer for the purposes of my improved lehr, we have invented a conveyer comprising a plurality of sets of endless conveying chains, the members composing the sets being in parallelism and carried at their ends on axially alined sprockets, and the sprockets for the adjacent ends of two sets being alternately arranged on a common shaft.

Thus 5a, 5b, 5c and 5d represent four sets of parallel conveying chains, having their ends carried on sprockets designated generally by the numeral 6, and at the adjacent ends of said sets the sprockets which carry the chains of one set are alternately arranged on a shaft with the sprockets of the other set, so that the chains of adjacent sets are interlaced at their ends and thus form in effect a continuous interlocked conveying surface.

The sprockets carrying the rear end of the rear or discharge conveyer comprising the chains 5a are fast on a shaft 7 which is journaled in bearings 8 beyond the discharge end of the tunnel, and said shaft is rotated at proper speed in a direction which is clockwise in Fig. 1. Thus the end of said shaft is provided with a driving sprocket 9 connected by a chain 10 to a speed reducer 11 which in turn is connected by a chain 12 with a variable speed transmission mechanism 13 which in turn is driven by a motor 14.

15, 16, 17 and 18 represent shafts disposed transversely of the chamber or lehr tunnel and having their ends journaled in the side walls thereof, the ends of the shafts protruding at one side of the chamber for mounting driving sprockets thereon.

The protruding end of the shaft 15 is provided with a large sprocket 19 which is connected by a chain 20 with a like sprocket 21 on the shaft 7, thus driving shafts 7 and 15 in unison, and preferably at the same speed. The shaft 15 is provided with a second and smaller sprocket 22 which is connected by a chain 23 with a larger sprocket 24 on the shaft 16. The shaft 16 is further provided with a smaller sprocket 25 which is connected by a chain 26 with a larger sprocket 27 on the shaft 17.

It is thus apparent that the shafts 15, 16 and 17 are driven from the shaft 7 but at progressively lessened speed.

The shaft 17 is further provided with a smaller sprocket 28 which is connected by a chain 29 with a sprocket 30 of a variable speed transmission device 31 which in turn is coupled to the protruding end of the shaft 18.

The shaft 18 is driven at a greater speed than the shaft 17 for a purpose to be more fully described, and its relative speed may be regulated.

The sprockets which carry the front ends of the conveyer chains 5a are loose on the shaft 15, while the sprockets which carry the rear ends of the chains 5b are fast on the shaft 15. The sprockets which carry the front ends of the chains 5b are loose on the shaft 16 while the sprockets which carry the rear ends of the chains 5c are fast on the shaft 16. The sprockets which carry the front ends of the chains 5c are loose on the shaft 17 while the sprockets which carry the rear ends of the chains 5d are fast on the shaft 17. The sprockets which carry the front ends of the chains 5d, indicated at 6a in Fig. 3 are loose on the shaft 18 and alternating on shaft 18 between the sprockets 6a on the central portion of shaft 18 are the sprockets 6b which are fast on the shaft 18 and, which carry the rear or inner ends of the chains 5e which form the intake conveyer and which extend forwardly through the front opening 4. At their front ends the chains 5e are carried by sprockets 6c which are carried by a shaft 32 whose ends are journaled in a stand 33 mounted on and vertically adjustable relatively to a base 34.

Within the front end of the lehr tunnel and at either side of the intake conveyer a horizontal transfer table 35 is mounted, and suitable means are provided for transferring the ware from the intake conveyer across said tables to the conveyer chains 5d.

Thus we may provide an oscillating sweeper arm 36 fixed to the lower end of a vertical shaft 37 depending through the roof of the tunnel and journaled in a suitable stand 38 mounted on the roof. The upper end of the shaft 37 is provided with a beveled pinion 39 which is engaged by two oppositely arranged, interrupted beveled pinions 40 fast on a horizontal shaft 41 which is driven in a constant direction as by a motor 42. The arm 36 is thus caused to swing alternately in opposite directions over the intake conveyer, the transfer tables and the front ends of the conveyer chains 5d.

The side surfaces of the arm 36 are conformed to properly engage the ware. Thus they may be provided with recesses 43 to fit the sides of the ware, an arm with properly shaped recesses being substituted to suit the particular ware to be introduced into the lehr. The tables 35 are provided with arcuate guides 44 to assist in maintaining the ware in proper paths while being transferred.

We provide means for supplying the necessary heat to the front portion of the lehr for the annealing operation.

Thus 45 represents a combustion chamber extending under the front of the lehr tunnel, a removable metal plate 46 forming the roof of the chamber and the floor of the tunnel and said plate being apertured as at 47 for the admission of heat to the tunnel. 48 is a gas burner extending into the front end of the chamber 45. A flue 49 extends rearwardly from the chamber 36 under the tunnel, the roof-floor being formed by the removable plates 50. At its outer end the flue 49 is connected to an exhauster 51 coupled up to the variable speed transmission mechanism 13.

52 represents metal boxes which forms the roof of the rear or discharge end of the tunnel and have perforated floors. Each of said boxes is connected by a pipe 53, provided with a valve 54 with a header pipe 55 which is connected to a blower 56 driven by a chain 57 leading to the speed reducer 11. Thus air may be introduced into the tunnel for the proper reduction of the temperature, such introduction being controlled and graduated by means of the valves 54.

It is evident that by properly proportioning the relative speeds of the chains of the intake conveyer and of the chains of the lehr conveyers and employing the transfer device for receiving the intaken article and depositing it on the lehr conveyers, the full capacity of the lehr may be utilized and the output of the same may be greatly increased without increasing the length of the lehr. This works a decided economy of valuable factory space and also an economy in fuel consumption.

It is further evident that the aggregate temperature loss attending the operation of the lehr is greatly reduced and consequently the amount of heat replacement required is correspondingly lessened.

It is further evident that owing to the relative fast speed of the intake conveyer compared to that of the chains 5d the articles will be arranged in close juxtaposition on the chains 5d and will thus be maintained at substantially uniform temperature while traveling on said chains. The arrangement whereby the chains progressively increase in speed of travel toward the rear or discharge end of the chamber results in the gradual separation of the articles as they approach the discharge or cooling end of the chamber, thus facilitating the cooling of the articles.

It is further evident that the cooling of the articles in the rear portion of the chamber may be regulated by the selective introduction of air through the chamber roof.

It will further be noted that the tension on the conveyer chains decreases progressively toward the front or intake end of the chamber where the temperatures are the highest. This is a very substantial advantage as the conveyers subjected to the greatest heat are likewise subjected to the least tension or strain, thus prolonging their life and increasing their efficiency.

A convenient and satisfactory length for the individual conveyers is ten or twelve feet.

What we desire to claim is:—

1. The combination with a heat-treatment chamber of means for causing the articles to be treated to travel through the chamber and comprising a plurality of conveyer elements arranged to successively receive the articles, the speed of movement of said conveyer elements increasing progressively toward the discharge end of the chamber.

2. The combination with a heat-treatment chamber of means for causing the articles to travel through said chamber, said means being arranged to progressively increase the speed of travel of the articles toward the discharge end of the chamber.

3. The combination with a heat-treatment chamber characterized by decreasing temperatures toward the discharge end of the chamber, and means for causing the articles to travel through said chamber at a speed increasing toward the discharge end of the chamber.

4. The combination with a heat-treatment chamber of means for causing the articles to travel through the chamber and comprising a plurality of sets of endless conveyer elements, said sets being arranged to successively receive the articles and each set being composed of a plurality of parallel conveyers, sprockets carrying the ends of said elements, and shafts upon which said sprockets are mounted, the sprockets for adjacent ends of sets being mounted on a common shaft, the sprockets which carry the elements of one set being fixed on said shaft while the sprockets carrying the elements of the other set are loose on said shaft, the fixed sprockets carrying the delivery ends of said elements while the loose sprockets carry the receiving ends of the elements.

5. The combination with a heat-treatment chamber of means for causing the articles to travel through the chamber and comprising a plurality of sets of endless conveyer elements, said sets being arranged to successively receive the articles and each set being composed of parallel conveyers, sprockets carrying the ends of said elements, and shafts upon which said sprockets are mounted, the sprockets for adjacent ends of sets being alternately arranged on common shafts the sprockets for one set being fixed on a shaft while the sprockets for the other set are loose on said shaft, the fixed sprockets carrying the delivery ends of said elements while the loose sprockets carry the receiving ends of the elements.

6. The combination with a heat-treatment chamber of means for causing the articles to travel through said chamber, the speed of said means being regulated to cause a separation of the articles as they move toward the discharge end of said chamber.

7. The combination with a heat-treatment chamber of conveyer means for causing the articles to travel through said chamber, means for depositing the articles in juxtaposition on said conveyer means at the receiving end of said chamber, and means whereby the articles are separated as they travel toward the discharge end of the chamber.

8. The combination with a heat-treatment chamber of means for delivering the articles to be treated at a relatively high speed to the chamber, and means for causing the articles to travel through the chamber including means for initially retarding the speed of travel and thereafter accelerating said speed.

9. In a lehr for annealing glassware, the combination of a lehr chamber, means for maintaining a heated area in the lehr chamber and also a cooler area therein, and conveyer mechanism for the lehr comprising means for depositing the ware in relatively closely spaced relation in the heated area and for causing the ware to be separated in the cooler area.

10. In a lehr for annealing glassware, the combination of a lehr chamber, means for maintaining a heated area in the lehr chamber and also a cooler area therein, and conveyer mechanism for the lehr comprising means for depositing the ware in relatively closely spaced relation in the heated area and for causing the ware to be progressively separated as it traverses the cooler area.

11. In a lehr for annealing glass, the combination with a lehr chamber and means for heating a portion of the chamber and for cooling another portion of the chamber, conveyer means arranged to cause the glass to travel at accelerated speed from the heated area through the cooler area, and means whereby the cooling is increased with the increase of speed of travel.

12. In a lehr for annealing glassware, the combination of the lehr chamber and of means for heating a portion of the chamber and cooling another portion of the chamber, of conveyer means in said chamber arranged to increase the spacing between the ware as it passes from the heated portion to the cooled portion, and means for increasing the cooling as the spacing is increased.

13. In a lehr for annealing glassware, the combination of the chamber having a heated portion and a cooled portion, and conveyer means in said chamber, said conveyer means comprising a relatively low speed in the heated position of the chamber and a relatively high speed in the cooled position of the chamber.

Signed at Pittsburgh, Pa., this 20th day of February 1928.

WILLIAM A. MORTON.
PAUL L. GEER.

DISCLAIMER 1,828,904.—*William A. Morton*, Pittsburgh, and *Paul L. Geer*, Bellevue, Pa. HEAT-TREATMENT CHAMBER. Patent dated October 27, 1931. Disclaimer filed September 18, 1933, by the assignee, *Amco, Incorporated*, and the patentees.

Hereby enter this disclaimer to that part of the claim in said specification which is contained in claims 2, 3, 6, and 13 of said Letters Patent and which is in the following words, to wit:

"2. The combination with a heat-treatment chamber of means for causing the articles to travel through said chamber, said means being arranged to progressively increase the speed of travel of the articles toward the discharge end of the chamber."

"3. The combination with a heat-treatment chamber characterized by decreasing temperatures toward the discharge end of the chamber, and means for causing the articles to travel through said chamber at a speed increasing toward the discharge end of the chamber."

"6. The combination with a heat-treatment chamber of means for causing the articles to travel through said chamber, the speed of said means being regulated to cause a separation of the articles as they move toward the discharge end of said chamber."

"13. In a lehr for annealing glassware, the combination of the chamber having a heated portion and a cooled portion, and conveyer means in said chamber, said conveyer means comprising a relatively low speed in the heated position of the chamber and a relatively high speed in the cooled position of the chamber."

[*Official Gazette October 10, 1933.*]